Patented July 12, 1949

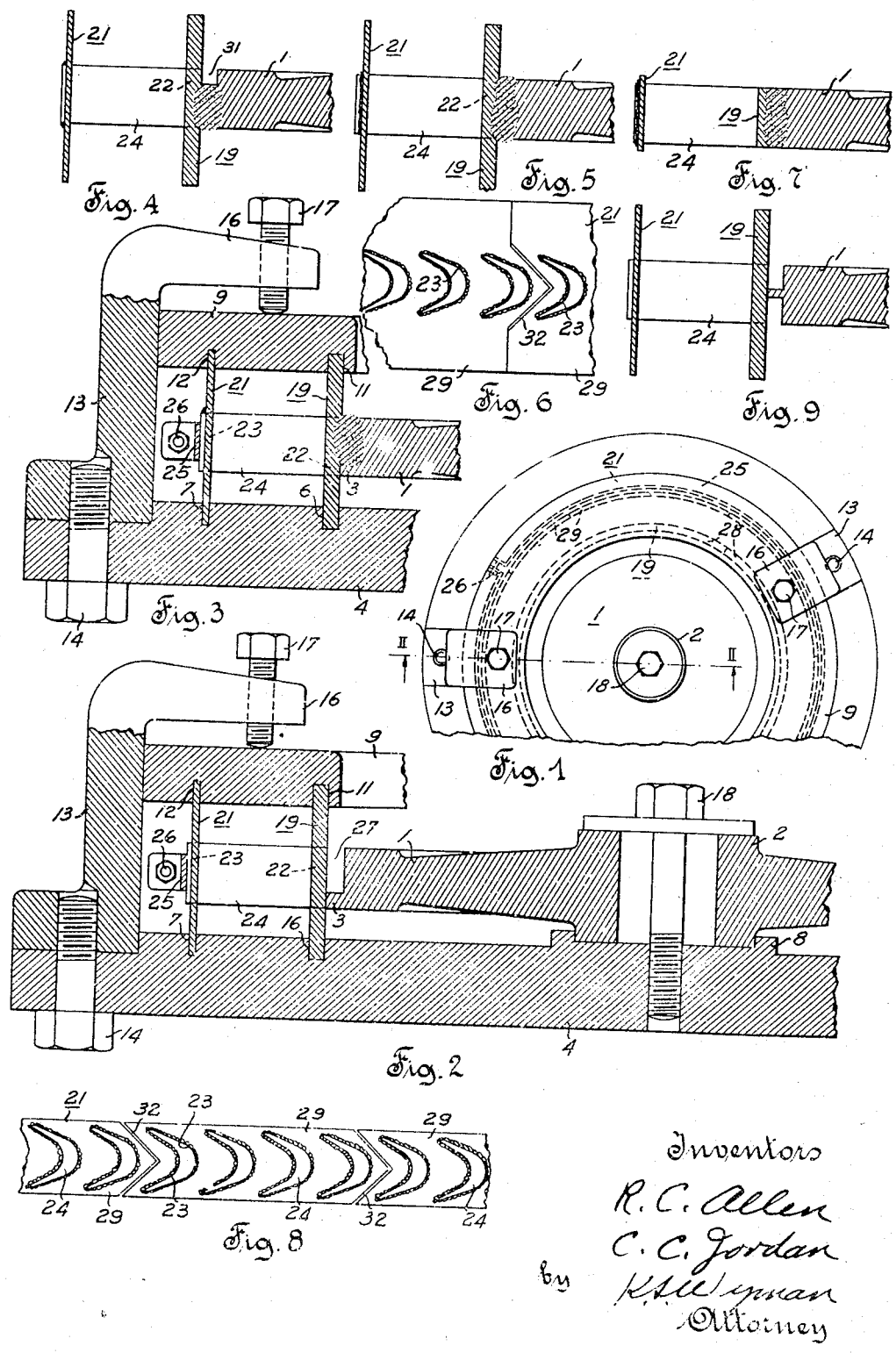

2,475,772

UNITED STATES PATENT OFFICE 2,475,772

METHOD OF BLADING ROTORS AND OTHER ELEMENTS

Robert C. Allen and Cecil C. Jordan, Wauwatosa, Wis., assignors to Allis-Chalmers Manufacturing Company, Milwaukee, Wis., a corporation of Delaware Application March 31, 1943, Serial No. 481,206

3 Claims. (Cl. 29—156.8)

This invention relates generally to the bladed elements of elastic fluid turbines, compressors and the like and more particularly to a method of and apparatus for assembling and attaching plain stamped, forged or rolled blade sections to the periphery of a rotor disk or other element to be bladed.

The primary object of this invention is to provide an improved method of accurately blading rotors and other elements whereby manufacturing costs are materially reduced.

Another object of this invention is to provide an improved apparatus for use in carrying out the above specified method.

More specifically the method of the present invention comprises providing an assembly having blades supported by concentrically spaced apertured base and shroud strips through which the blades extend with their opposite ends terminating approximately flush with the inner and outer surfaces of such strips, positioning and holding the assembly with the apertured portion of its base strip opposing a peripheral portion of an element to be bladed and with the outer ends of the blades and proximate outer surface portions of the shroud strip weldably exposed, welding substantially all of the plain surface presented by the inner ends of the blades and by the portion of the inner side of the base strip included between the inner ends of the blades to the opposed peripheral portion of the element, and welding the outer end of each blade to the outer contiguous portion of the shroud strip in a manner leaving exposed most all of the outer surface of the latter.

The invention accordingly consists of the various details of construction and of the correlations of steps and procedures constituting the method as hereinafter more fully set forth in the appended claims and in the detailed description, in which:

Fig. 1 is a partial plan view illustrating the manner in which the blade elements are held in assembled relation against the periphery of a rotor disk;

Fig. 2 is a partial section taken on line II—II of Fig. 1;

Fig. 3 is a partial view similar to Fig. 2 illustrating the first steps performed in fusibly uniting the blade elements to the various parts;

Fig. 4 illustrates the assembly in inverted position preparatory to completing the fusible union of said parts;

Fig. 5 illustrates the complete fusible union of the various parts;

Fig. 6 is a partial plan view of the outer periphery of the united assembly shown in Fig. 5;

Fig. 7 is a view similar to Fig. 5 illustrating the completed assembly with the excess material removed;

Fig. 8 is a view of the outer periphery of the assembly shown in Fig. 7; and

Fig. 9 illustrates a modified disk periphery against which the blade elements may be assembled and held as shown in Figs. 1 and 2.

Referring to the drawing and more particularly to Figs. 1 and 2, it is seen that for purposes of illustration the invention may be readily carried out in blading a rotor disk 1 having a hub portion 2 and a simple peripheral portion presenting on one side thereof a circumferentially extending projection 3 by means of apparatus comprising: a circular jig member 4 embodying on one side thereof spaced inner and outer coaxial grooves 6 and 7, respectively, and a coaxial disk hub engaging projection 8 adapted to position said member on said disk with the inner surface of the groove 6 substantially flush with the outer surface on the projection 3; an annular jig member 9 having on one side thereof spaced inner and outer coaxial grooves 11 and 12 adapted for disposition in spaced opposed coaxial relation to the grooves 6 and 7 in jig member 4; a plurality of clamping members 13 detachably secured to circumferentially spaced peripheral portions of jig member 4 by any suitable means such as tap bolts 14, each member including an inwardly extending arm portion 16 carrying a tap bolt 17 adapted to engage a mid-portion of jig member 9; a tap bolt 18 or other equivalent means for detachably securing jig member 4 to the disk 1; a pair of base and shroud ring forming strips or bands 19 and 21 having therein blade receiving apertures 22 and 23, respectively, and having their opposite edges adapted for insertion in the opposed pairs of inner and outer coaxial grooves in jig members 4 and 9 with their apertures alined for the insertion of blades therethrough; blades 24 adapted for insertion through said alined apertures with their inner and outer ends terminating approximately flush with the inner and outer surfaces of the base and shroud strips, respectively; and a clamping ring 25 adapted to surround the outer ends of the blades and including a tightening device 26 operable to compress said ring and force the inner ends of the blades against the projection 3 on the disk 1.

The apparatus just described can be readily assembled by first inserting edge portions of the base and shroud strips 19 and 21 in the grooves 6 and 7, respectively, in jig member 4 so that the apertures 22 and 23 in said strips are alined for the insertion of blades therethrough, by next placing jig member 9 on said strips so that the edges of the strips are disposed within the grooves 11 and 12, by next inserting the blades 24 through the alined apertures 22 and 23 to provide an assembly comprising said jig members, strips and blades in which the inner and outer ends of the blades are approximately flush with the inner and outer surfaces of the base and shroud strips, respectively, by next securing jig member 4 to the disk 1 by means of tap bolt 18 which together with the disk engaging projection 8 on member 4 positions said assembly on the disk 1 with the apertured portion of base strip 19 engaging and forming with the projection 3 on disk 1 an upwardly facing weld metal receiving groove 27, by next applying clamping ring 25 to the exposed outer ends of the blades 24 to thereby force the inner ends of the blades firmly against the projection 3 on disk 1, and then securing clamping members 13 to jig member 4 and turning tap bolt 17 to firmly hold the strips 19 and 21 between jig members 4 and 9 as shown.

Obviously, the assembly procedure just described can be readily varied if desired and all that is necessary in this connection is to position and hold apertured base and shroud ring forming strips in spaced concentric relation with their apertures alined for the insertion of blades therethrough, inserting blades through said alined apertures to provide an assembly in which the inner and outer ends of the blades are approximately flush with the inner and outer surfaces of the base and shroud strips, respectively, and positioning and holding the assembly thus formed with the apertured portion of its base strip opposing a peripheral portion of an element to be bladed. The base and shroud bands may be formed with continuous ring strips, but a more accurate procedure is to employ band segments disposed in the end to end abutting ring forming relation indicated by the dotted line showing in Fig. 1 in which the base and shroud strip segments are designated 28 and 29, respectively, since the length of the segments can be readily varied to eliminate accumulating errors in aperture spacing. Moreover, the widths of the base and shroud strips are preferably made equal and considerably greater than the width of the blades to be inserted therethrough in order to simplify the jig structure and in order to space the opposed surfaces of the jig members a sufficient distance from the edges of the blades to facilitate fusibly uniting the apertured portion of the base strip to the opposed peripheral portion of the element to be bladed.

Upon completion of the assembly as shown in Fig. 2, the exposed apertured portion of the base strip, the exposed inner ends of the blades and exposed peripheral portion of disk 1 are fusibly united, preferably by substantially filling the groove 27 with weld metal; this operation being most easily performed with the assembly in the approximate position shown in Fig. 3. In addition, the exposed outer end portions of the blades may be fusibly united with proximate outer surface portions on the shroud strip by depositing weld metal on said portions as shown in Fig. 3, or if desired, weld metal can be readily deposited to fusibly unite both edge portions of the shroud strip to the proximate outer ends of the blades simply by placing the assembly shown in Fig. 3 in a vertical position, and this can be done either before or after weld metal has been deposited in the groove 27. After performing the hereinbefore specified operations, the jig members 4 and 9 and clamping ring 25 are removed from the now fusibly united assembly, and the projection 3 removed from the periphery of disk 1 by a turning or other suitable operation to provide a second oppositely facing groove 31 exposing an apertured portion of the underside of the base strip and a portion of the inner ends of the blades 24. The assembly is then preferably positioned as shown in Fig. 4 and said groove filled with weld metal as shown in Fig. 5; the entire outer ends of the blades being fusibly united to the proximate outer surface portion of the shroud strip as shown either before or after depositing weld metal in the groove 31.

A partial plan view of the assembly after all welding operations have been completed is shown in Fig. 6, and in this connection, particular attention is directed to the abutting ends of the shroud ring forming segments 29 which have their intermediate end portions spaced apart to provide transversely extending slots 32 separating the apertured portions of adjacent segments. All that remains to be done in order to complete the blading operation is to remove by turning or otherwise opposite edge portions of both strips, that is, of the base and shroud strips, to provide a shroud structure approximately equal in width to the outer ends of the blades and a base structure approximately equal in width to the inner ends of the blades and to the peripheral portion of the disk 1 as shown in Fig. 7; sufficient material being removed from the edges of the shroud strip to expose the opposite ends of the slots 32, thereby forming gaps separating the end portions of adjacent segments as shown in Fig. 8. In other words, removing both edge portions of the shroud strip produces a shroud structure comprising circumferentially spaced segments each of which is integrally united with the tip ends of the blades spanned thereby.

The hereinbefore described procedure, which is particularly applicable in blading rotating elements, and the apparatus for carrying it out enable rotors and other elements to be accurately bladed with a minimum of time and skill and with the use of standard blade sections, thereby materially reducing manufacturing costs. Said procedure and apparatus are readily applicable to the blading of rotors and other elements having a peripheral portion shaped differently from that shown in Fig. 2, one such different shape being shown in Fig. 9 by way of illustration, and in addition, it should be understood that although a greater reduction in manufacturing cost can be effected by using standard forms of blades having single surfaced ends in connection with rotors or other elements having a plain or simple peripheral surface portion to which the blades are to be attached, it is not intended to limit the invention to the exact procedure and details of construction herein shown and described, as various modifications within the scope of the appended claims may occur to persons skilled in the art.

It is claimed and desired to secure by Letters Patent:

1. The method of blading rotors and other elements which comprises positioning and holding apertured and relative wide base and shroud ring forming strips in spaced concentric relation with their apertures alined for the insertion of blades therethrough, inserting blades through said alined apertures to provide an assembly in which the inner ends of the blades are approximately flush with the inner side of the base strip, positioning and holding said assembly with the plain surface presented by the inner ends of the blades and by the portion of the inner side of the base strip included between the inner ends of the blades spaced in part from and forming with a peripheral portion of an element to be bladed having a width approximately equal to the width of the inner ends of the blades a first groove exposing a portion of the inner ends of said blades, substantially filling said first groove with weld metal and, welding the outer end of each blade to the outer contiguous portion of said shroud strip, forming a second oppositely facing groove exposing the remaining portion of said plain surface, substantially filling said second groove with weld metal, and removing opposite edge portions of both strips to provide a shroud structure approximately equal in width to the outer ends of said blades and a base structure approximately equal in width to the inner ends of said blades and to the peripheral portion of said element.

2. The method of blading rotors and other elements which comprises positioning and holding apertured and relative wide base and shroud ring forming strips in spaced concentric relation with their apertures alined for the insertion of blades therethrough, inserting blades through said alined apertures to provide an assembly in which the inner ends of the blades are approximately flush with the inner side of said base strip, positioning and holding said assembly with the plain surface presented by the inner ends of the blades and by the portion of the inner side of the base strip included between the inner ends of the blades opposing a peripheral portion of an element to be bladed having a width approximately equal to the width of the inner ends of the blades in said assembly and having on one side thereof a projection coacting with the opposed portion of said plain surface to form a first groove, substantially filling said groove with weld metal, welding the outer end of each blade to the outer contiguous surface portion of said shroud strip, removing said projection to provide a second oppositely facing groove, substantially filling said second groove with weld metal, and removing opposite edge portions of both strips to provide a shroud structure approximately equal in width to the outer ends of said blades and a base structure approximately equal in width to the peripheral portion of said element.

3. The method of blading rotors and other elements which comprises providing an assembly including as parts thereof, blades supported by concentrically spaced, apertured base and shroud strips through which the blades extend with their inner ends terminating approximately flush with the inner side of the base strip, said shroud strip being considerably wider than the length of the blade receiving apertures therein and being formed in segments disposed in end-to-end abutting relation with intermediate portions of their ends spaced apart to provide a transversely extending slot between adjacent end apertures of abutting segments, said slot extending transversely beyond the ends of the apertures, and including an element having a peripheral portion to be bladed, and including separate positioning means assemblable with and separable from the other parts of said assembly merely by relative movement of said positioning means and the other parts of said assembly, and positioning in said assembly the apertured portion of said base strip opposing said peripheral portion of said element and the outer ends of the blades and proximate outer surface portions of the shroud strip weldably exposed, welding said base strip and the inner ends of said blades to said element only, and welding the outer end of each blade to said shroud strip only, thereby providing a welded unitary structure comprising said element, said blades, and said base and shroud strips, separable from said positioning means merely by relative movement of said structure and said positioning means, so separating said structure from said positioning means, and removing opposite edge portions of said shroud strip to expose opposite ends of said slot and provide a shroud embodying circumferentially fully spaced segments.

ROBERT C. ALLEN.
CECIL C. JORDAN.

REFERENCES CITED

The following references are of record in the file of this patent:

UNITED STATES PATENTS

| Number | Name | Date |
|---|---|---|
| 1,470,505 | Steenstrup | Oct. 9, 1923 |
| 1,547,838 | Steenstrup | July 28, 1925 |
| 1,889,986 | Haywood | Dec. 5, 1933 |
| 1,932,278 | Lacey | Oct. 24, 1933 |
| 1,938,382 | Haigh | Dec. 5, 1933 |
| 2,080,563 | Eskilson | May 18, 1937 |
| 2,392,281 | Allen | Jan. 1, 1946 |

FOREIGN PATENTS

| Number | Country | Date |
|---|---|---|
| 118,912 | Austria | Sept. 10, 1930 |
| 430,908 | Germany | June 24, 1926 |